United States Patent
Finley (10) Patent No.: US 7,846,302 B1
(45) Date of Patent: Dec. 7, 2010

(54) FRACTIONAL DESTRUCTIVE DISTILLATION ARRAY

(76) Inventor: Dana J. Finley, 3206 Candelaria Rd., NE., Albuquerque, NM (US) 87107-1907

( * ) Notice: Subject to any disclaimer, the term of this patent is extended or adjusted under 35 U.S.C. 154(b) by 634 days.

(21) Appl. No.: 11/811,813

(22) Filed: Jun. 12, 2007

Related U.S. Application Data (60) Provisional application No. 60/812,719, filed on Jun. 12, 2006.

(51) Int. Cl.
*C10B 9/00* (2006.01)
(52) U.S. Cl. .......................... 202/96; 202/118; 202/262
(58) Field of Classification Search ............... 202/96, 202/262, 118; 198/545
See application file for complete search history.

(56) References Cited

U.S. PATENT DOCUMENTS

| | | | | |
|---|---|---|---|---|
| 3,020,212 A | * | 2/1962 | Lantz | 202/118 |
| 4,648,328 A | * | 3/1987 | Keough | 110/229 |
| 5,129,995 A | * | 7/1992 | Agarwal | 201/21 |
| 5,258,101 A | * | 11/1993 | Breu | 202/131 |
| 5,705,035 A | * | 1/1998 | Avetisian et al. | 201/3 |
| 5,714,043 A | * | 2/1998 | Finley et al. | 202/262 |
| 5,871,619 A | * | 2/1999 | Finley et al. | 202/262 |
| 6,722,593 B1 | * | 4/2004 | Dobozy | 241/29 |
| 6,840,712 B2 | * | 1/2005 | Satchwell et al. | 405/128.8 |

* cited by examiner

*Primary Examiner*—N. Bhat
(74) *Attorney, Agent, or Firm*—Rod D. Baker (57) ABSTRACT

A system and apparatus for pyrolyzing solid wastes to recover there-from useful hydrocarbon distillates, carbon black, and other potentially commercially valuable by-products. Pyrolysis and distillation may be performed substantially continuously, rather than by batch processing. The pyrolysis unit including a distillation array featuring two or more parallel, heated, conveyors, arranged in alternative switch-backs, through which a feedstock is moved during pyrolysis. The feedstock moves from conveyor to conveyor, and thus may pass through zones of different temperature to optimize the distillation of various constituents from the feedstock. Friction-reducing components, such as rollers, are situated between adjacent pairs of conveyors so that temperature differentials, and the resulting contract or expansion of system components, are accommodated and associated stresses ameliorated.

14 Claims, 4 Drawing Sheets

FRACTIONAL DESTRUCTIVE DISTILLATION ARRAY

CROSS-REFERENCE TO RELATED APPLICATIONS

This application claims the benefit of the filing of U.S. Provisional Patent Application Ser. No. 60/812,719 filed on Jun. 12, 2006, and the specification thereof is incorporated herein by reference.

BACKGROUND OF THE INVENTION

1. Field of the Invention (Technical Field)

The present invention relates to fractional destructive distillation, particularly to fractional destructive distillation arrays, and more specifically to a pyrolytic distillation apparatus that is self-compensating for differential thermal expansion.

2. Description of Related Art

Destructive distillation of organic containing materials, also known as pyrolysis, has been known for some time. Such systems are particularly useful for treating, recovering, and recycling waste products and waste constituents. Discarded materials containing appreciable quantities of hydrocarbons are particularly attractive candidates for pyrolytic distillation and recovery. Motor vehicle tires, for instance, contain large amounts of potentially useful carbon and hydrocarbons compositions which, if recovered, are desirable for re-use. Discarded tires alone account for nearly two percent of all solid waste. Further, discarded tires pose health and environmental challenges due in part to their extremely slow deterioration rate, flammability, and potentially hazardous gasses emitted when ignited.

Several systems have been created in an attempt to successfully recycle organic materials. Destructive distillation systems currently in use typically heat the organic containing materials in a large airtight chamber at a very high temperature. Heating organic materials to high temperatures, ordinarily while also minimizing the amount of available air (oxygen), results in the pyrolysis of the material into simpler (usually more useful) constituent compounds. Thus owing to the lack of available oxygen in the airtight pyrolysis chamber, the organics-containing materials disposed therein break down into their ingredient chemical substances.

Many or most pyrolytic distillation systems currently in use are "batch" processors, whereby a defined quantity of feedstock is introduced into the treatment chamber, the chamber is closed while the material undergoes pyrolysis, and the chamber is opened to remove the resulting by-products and to introduce a new batch of feedstock to repeat the process. A drawback to such an airtight chamber design is that the chamber must be periodically opened and the residue which builds up therein must be cleaned out. Serial treatment of separate batches of material is inefficient relative to "continuous" processing.

Known systems and methods for pyrolysis of wastes, including used motor vehicle tires, include the disclosures of the following United States patents, to which reference is made for background on the science of pyrolytic and fractional distillation of solid wastes: U.S. Pat. No. 6,835,861 to Nichols, et al.; U.S. Pat. No. 6,736,940 to Masemore, et al.; U.S. Pat. No. 6,372,948 to Flanigan; U.S. Pat. No. 6,271,427 to Ershag; U.S. Pat. No. 6,221,329 to Faulkner, et al.; U.S. Pat. No. 5,167,772 to Parker, Sr.; and U.S. Pat. No. 4,740,270 to Roy.

Auger elements contained within a stack or array of sealed conduits can be used to construct a continuous flow distillation system. In such systems, an array of conveyors moves feedstock through the closed conduits (such as pipes or tubing). Continuous flow distillation systems permit processing on an ongoing basis, improving system efficiency by reducing significantly the need to access the interior of the otherwise airtight pyrolysis chamber.

However, due to the extreme difference in temperature encountered throughout a continuous system, differential thermal expansion causes great difficulties to creating a successfully operating design. There is thus a present need for a method and apparatus which provides a successfully operating continuous flow fractional destructive distillation array which can self-adjust for large amounts of differential thermal expansion.

SUMMARY OF THE INVENTION

A system and apparatus for pyrolyzing solid wastes, particularly used motor vehicle tires, to recover there-from useful hydrocarbon distillates, carbon black, and other potentially commercially valuable by-products. Pyrolysis and distillation may be performed substantially continuously, rather than by batch processing. The pyrolysis unit including a distillation array featuring two or more parallel, heated, conveyors, arranged in alternative switch-backs, through which a feedstock is moved during pyrolysis. The feedstock moves from conveyor to conveyor, and thus may pass through zones of different temperature to optimize the distillation of various constituents from the feedstock. Friction-reducing components, such as rollers, are situated between adjacent pairs of conveyors so that temperature differentials, and the resulting contraction or expansion of system components, are accommodated and associated stresses ameliorated.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

The present disclosure is of a system and apparatus for effectively pyrolyzing solid wastes, particularly motor vehicle tires, to recover there from useful hydrocarbon distillates, carbon black, and other potentially commercially valuable by-products. An advantage of the system is that pyrolysis and distillation may be performed substantially continuously, rather than by batch processing. Further, there is provided a distillation array that is relatively compact.

There is provided according to this disclosure a pyrolysis unit including a distillation array. The distillation array features two or more parallel, heated, conveyors, arranged in alternative switch-backs, through which a feedstock is moved during pyrolysis. The feedstock moves from conveyor to conveyor, and thus may pass through zones of different temperature to optimize the distillation of various constituents from the feedstock. A conveyor typically will have an auger bit mounted for powered rotation within an auger conduit, so that rotation of the bit pushes feedstock along the full length of the conveyor. Friction-reducing components, such as rollers and glide plates, are situated between adjacent pairs of conveyors so that temperature differentials, and the resulting contraction or expansion of system components, are accommodated and associated stresses ameliorated.

The term "auger", both singularly and in the plural, as used throughout the specification is intended to include not only the inclined plane wrapped around a cylindrical shaft (i.e., the auger bit), but also a pipe, tube, or other similar structure which houses the auger bit. The pipe, tube, or other similar structure is preferably substantially airtight so as to prevent the heated feedstock from reacting with oxygen in air or greatly reduce the amount oxygen which is capable of entering the system. Further the term "auger" is not limited only to those auguring devices which comprise a spiral bit on a shaft, wherein the cylinder is caused to rotate within an enclosed space; rather the term "auger" can include any device, apparatus, and/or structure which can be used to transport a feedstock through a closed environment at temperatures required for the pyrolysis of the selected feedstock. For example, an "auger" as defined herein can also include but is not limited to a conveyor belt, or a plurality of chain drives with numerous partitions protruding substantially parallel therefrom and which partitions thus force the feedstock along the enclosure.

The term "roller," both singularly and in the plural is intended to include any and all devices, apparatuses, structures, and combinations thereof which can reduce a sliding friction between two surfaces. As such, the term "roller" can include one or more wheels, ball bearings, glide plates, and combinations thereof and the like.

Figure 1:
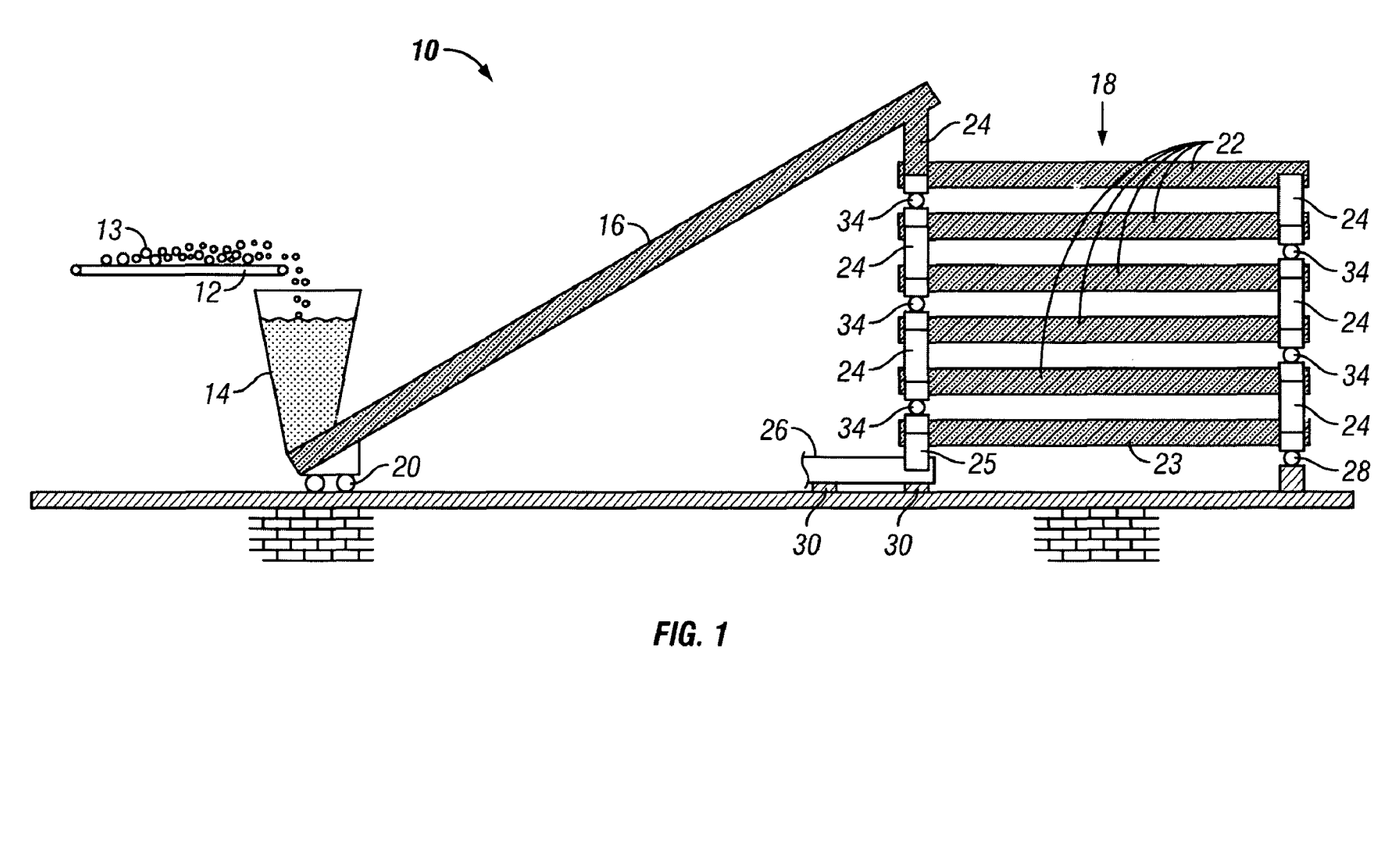
FIG. 1 is a schematic front view diagram illustrating a pyrolytic treatment system according to the present disclosure.

FIG. 1 is a comprehensive view of the overall system according to this disclosure. The pyrolysis unit 10 processes feedstock 13 from a source 12 via a liquid seal 14 for delivery by a feed conveyor 16 to a distillation array 18. The feed conveyor 16 and distillation array 18 are closed and sealed from the ambient atmosphere, so that pyrolysis occurs within the array 18 under low-pressure, substantially oxygen-free conditions according to principles known in the art. Spiral augers or other suitable conveyor means move feedstock through the distillation array 18 while undergoing pyrolysis.

The pyrolysis unit 10 optionally has a feedbelt 12 or other suitable means for moving feedstock 13, such as shredded and/or comminuted used tire material, to feeder liquid seal 14. As suggested by FIG. 1, feedstock 13 preferably drops by gravity from the feedbelt 12 into the vessel of the liquid seal 14. There preferably is no significant rigid physical connection between the feedbelt assembly and the liquid seal assembly, such that the latter is able to shift slightly (i.e., back and forth, right-to-left, as seen in the figure) during the operation of the pyrolysis unit 10. Feeder auger 16 then transports feedstock from liquid feeder 14 up and into the top, initial end of the distillation array 18.

Feeder liquid seal 14 is a vessel at least partially filled with a liquid (such as oil) of lesser specific gravity than that of the feedstock 13. Thus, when feedstock 13 is fed into liquid seal 14, the feedstock sinks to the bottom of liquid seal 14. Feedstock 13 in the liquid seal 14 is removed there-from by a feeder conveyer, such as a closed feeder auger 16, in fluid communication with the bottom of the liquid seal vessel, as suggested by FIG. 1. The liquid within liquid seal 14 acts as a seal for the "upstream" portion of the pyrolysis unit, so that heated (potentially explosive) gasses from within the distillation array 18 and feeder auger 16 are prevented from escaping the system, and whereby outside air is prevented from entering the array 18. U.S. Pat. No. 5,714,043 to Finley, et al., hereby incorporated by reference, offers additional description of the configuration and function of a liquid seal 14 apparatus suitable and adaptable for use within the presently disclosed system.

Continued reference is made to FIG. 1. The liquid seal 14 and the lower end of feeder auger 16 are mounted on friction-reducing members such as wheels or rollers 20. Rollers 20 allow the liquid seal 14 and lower end of feeder auger 16 to move in relation to the ground. Slight rolling movement upon rollers 20 permit thermal expansion and/or contraction of feed auger 16, and distillation array 18 to occur without excessive strains on feeder auger 16. Thus, by means of the feeder auger rollers 20, the lower end of the feeder auger 16, as well as the associated liquid seal 14, are free for modest wheeled back-and-forth movement very short distances to accommodate and relieve thermally induced strain in the feeder auger 16.

Figure 2:
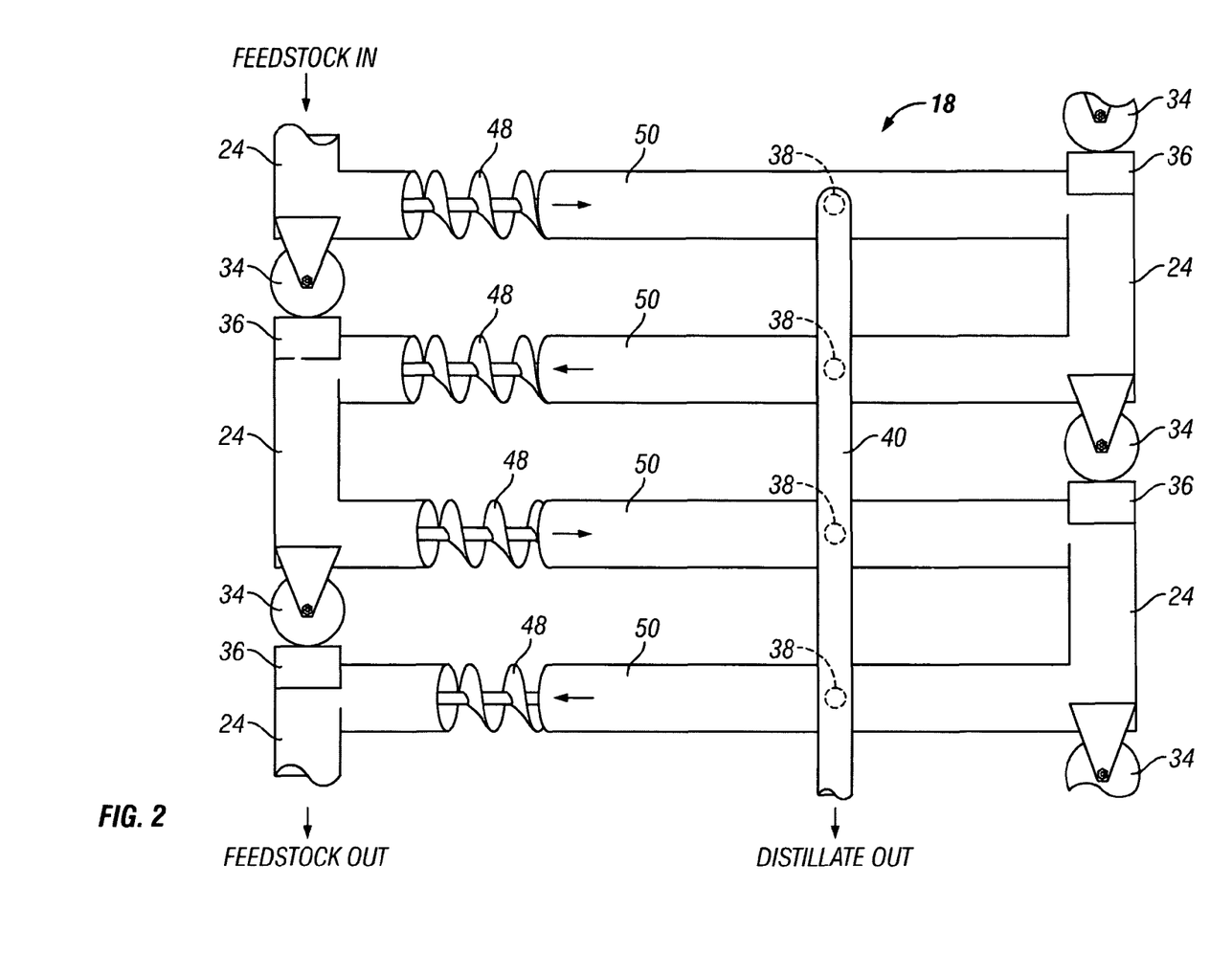
FIG. 2 is an enlarged partial front view, with minor portions cut away to reveal interior auger components, of the distillation array seen in FIG. 1, and showing thermal expansion members and outlet ports for the various substances distilled from feedstock material.
Figure 3:
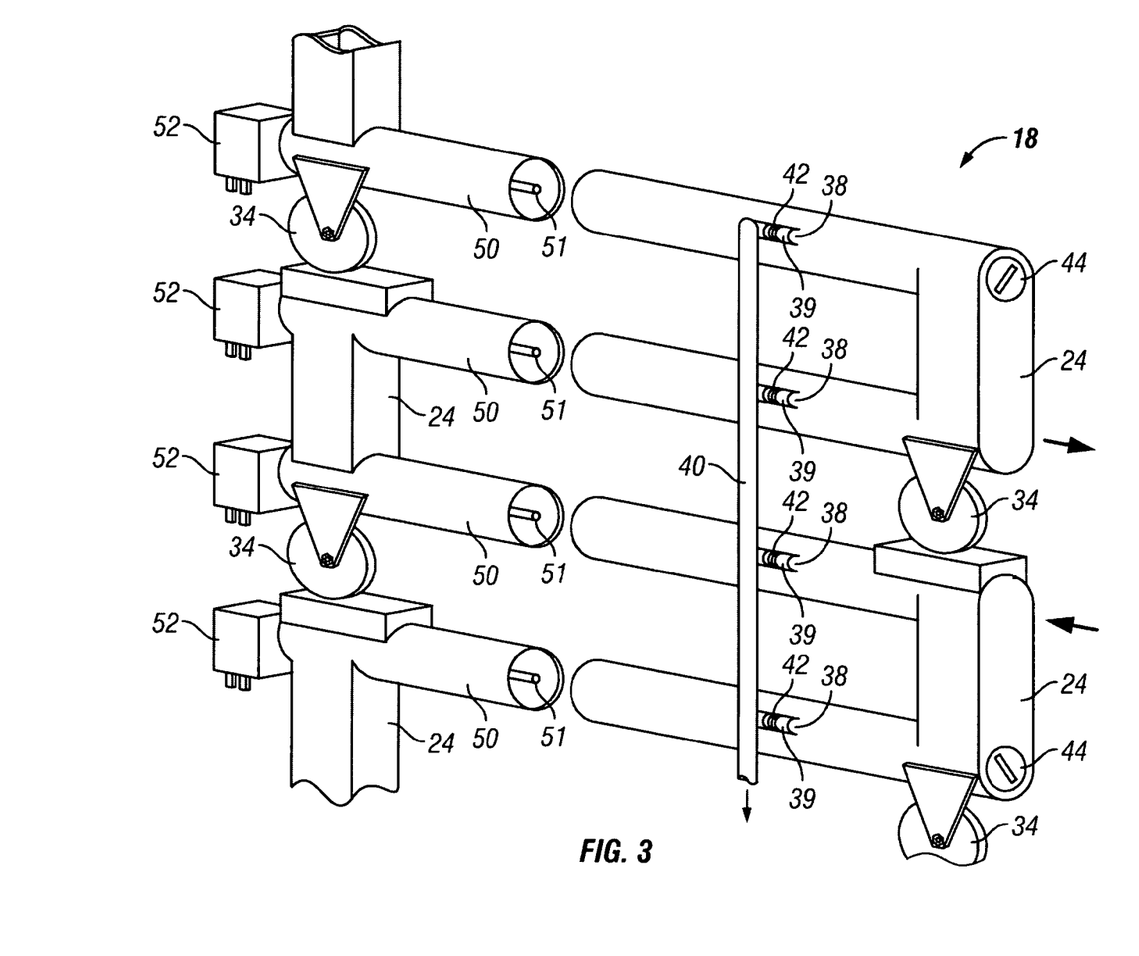
FIG. 3 is a front perspective view of the apparatus depicted in FIG. 2.

Distillation array 18 has a plurality of two or more conveyors 22 which preferably are disposed horizontally, and arranged in a vertically "stacked" array as shown in FIGS. 1-3. Each conveyor 22 moves feedstock there-through, as by a rotating auger, as described further herein. Below and in sealed fluid communication with each conveyor 22 is a downwardly extending down-chute 24. Each down-chute 24 also is in sealed fluid communication with the adjacent, next-below conveyor 22. The down-chutes 24 may be constructed of rigid metal panels and may be of welded construction. Thus, the down-chutes 24 preferably are substantially rigid, and are fixedly secured (as by welding) to the conveyors 22. The down-chutes 24 thus serve not only to direct the movement of feedstock, but also as structural components of the array 18, holding pairs of conveyors 22 in parallel, spaced-apart relation.

Accordingly, feedstock which has traversed the length of a conveyor 22 can drop through the interior of a down-chute 24 into the next conveyor, and begin traversing it. A terminal down-chute 25 may be provided on the lowest conveyor 23, via which remaining non-pyrolyzed byproduct (for example, carbon black) falls to the outlet 26 for removal from the system. The outlet 26, which may be provided with a cooling jacket, is the principle means by which solids are removed from the array 18. Outlet 26 is in operative connection with a valve of suitable type to prevent backflow of gasses through the outlet and into the array 18.

Referring to FIG. 1, it is seen that distillation array 18 preferably is fixedly connected to the ground fixed at block 30. Thus, the structure at block 30 secures the complete array 18 against gross movement in relation to the ground. Block 32 is preferably provided at the other end of the distillation array 18, and provides a smooth, hard surface upon which a friction-reducing glide plate may slide, or an array lower roller 28 may roll.

The system includes a pyrolysis section that is divided into a plurality of individual heating sections or zones. Each of the heating zones is heated to a distinct operating temperature that is independent from the operating temperature of the remaining heating zones. Consequently, the feedstock to be processed thus is conveyed through a series of treatment sections of preferably different interior temperatures, from which desirable substances are distilled and extracted. In the preferred embodiment, each conveyor portion 22 is a separate treatment section, which heats the feedstock moving therein to a pre-selected temperature for the pyrolysis and fractional distillation of a target compound. The internal temperature of each treatment section or conveyor 22 preferably is regulated independently, so that each conveyor can be heated to a selected high temperature. The conveyors 22 can all be heated, by any suitable means (not shown in the drawing figures) known in the art, to the same temperature or each conveyor section 22 may be heated to a distinct temperature. For example, the conveyor sections 22 may be heated to progressively higher temperatures as feedstock moves through the array 18 from its connection with the feeder auger 16 to the solid by-product outlet 26.

Those skilled in the art will recognize that auger array 18 preferably is heated at temperatures sufficient to enable at least partial fractional destructive distillation of a feedstock. Because different substances and compounds are rendered at different temperatures in a fractional distillation scheme, conveyors 22 preferably are heated at different temperatures such that a different constituent of the feedstock may be rendered at each section 22.

In the preferred embodiment, the plurality of conveyors 22 are constituted from an interconnected series of closed auger conduits. The conduits 50 preferably are all situated horizontally, but arranged in a vertical array, preferably one conduit directly above another to define the overall distillation array 18. The distillation array 18 features at least two, and preferably three or more conduits 50. Referring especially to FIGS. 2-3, each conveyor section 22 includes a spiral auger 48 mounted for powered rotation coaxially within a correspondingly-sized auger conduit 50. As shown in the figures, the conduits 50 preferably are arranged parallel to one another, with proximate ends of adjacent conduits connected by the down-chutes 24, whereby feedstock moves from an end of one conduit into the nearby end of the adjacent conduit directly below. Thus feedstock enters the first or "upstream" end of each conduit 50 via a down-chute 24 extending upward from that end of the conduit. The feedstock is pushed longitudinally (while undergoing pyrolysis) along the full length of each conduit 50 by the action of the rotating auger 48 according to conventional auger function. Partially processed feedstock exits the "downstream" end of a conduit 50 by dropping under force of gravity into and through another down-chute 24 extending downwardly for connection to the upstream end of the next auger conduit.

As seen in FIG. 3, one or preferably even both ends of each auger conduit 50 has a sealed but removable cap 44 to permit access into the conduit interior for cleaning and maintenance. It will be readily appreciated also that the conduits 50 preferably are thermally insulated, as by an insulating wrap (not shown) to maintain the desired high temperatures within the interiors of the conveyors 22.

The sealed junctions between ends of conduits 50 and associated down-chutes 24 preferably are configured such that all feedstock material approaching an end of a conduit necessarily falls into the open down-chute there-below; the interior transition from the downstream end of a horizontal conduit 50 to the associated vertical down-chute 24 is free from any ledges or shelves (e.g., severed edges of the conduit) upon which feedstock may undesirably accumulate. As all feedstock drops down a down-chute 24, little remains at the downstream terminus of the conduit 50 to cause undesirable fouling of the apparatus or binding of the auger 48.

It is observed that the interior spiral augers 48, or other suitable conveyor means, are rotated to move feedstock in alternating opposite directions through the array 18. Feedstock undergoing pyrolysis and distillation falls from one conduit 50 to the next, reverses direction of movement, and is conveyed to the opposite end of that conduit where it passes to the next adjacent conduit, and so on. The solid directional arrows in FIG. 2 indicate that feedstock is driven by the auger 48 from left to right in the uppermost conduit 50, from right to left in the next-below conduit, and then from left to right in the next conduit, and then reversing direction again in the lowest conduit in FIG. 2, and so on. This sort of serpentine flow through the distillation array 18 permits the array to be relatively compact, and the complete pyrolysis unit 10 to have a comparatively small footprint. The rather "zigzag" movement of feedstock through a vertically aligned array 18 may permits a complete, functional, pyrolytic unit 10 to be scaled for mounting upon a large tractor truck trailer for portability from location to location.

Those skilled in the art will readily recognize that the distillation array 18 of the present disclosure can produce desirable results with different numbers of conveyor sections 22, and that the array of the present invention is thus not limited to the number of auger conduits depicted in the drawing figures.

FIG. 3 suggests that the auger shafts 51 are in operative connection with one or more sources of rotary power, such as a corresponding number of engines or electric motors 52. Each auger 48 may have a dedicated motor 52, or alternatively a single (or pair, etc.) motor may drive all augers by means of gear trains, chain drives, or the like, as well-known in the art of mechanics. The rotation (speed, start, stop) of the augers 48 is regulated by the controlled actuation of the motors 52 by means of voltage regulators or throttles and/or transmissions, also as available from the known art.

Figure 4:
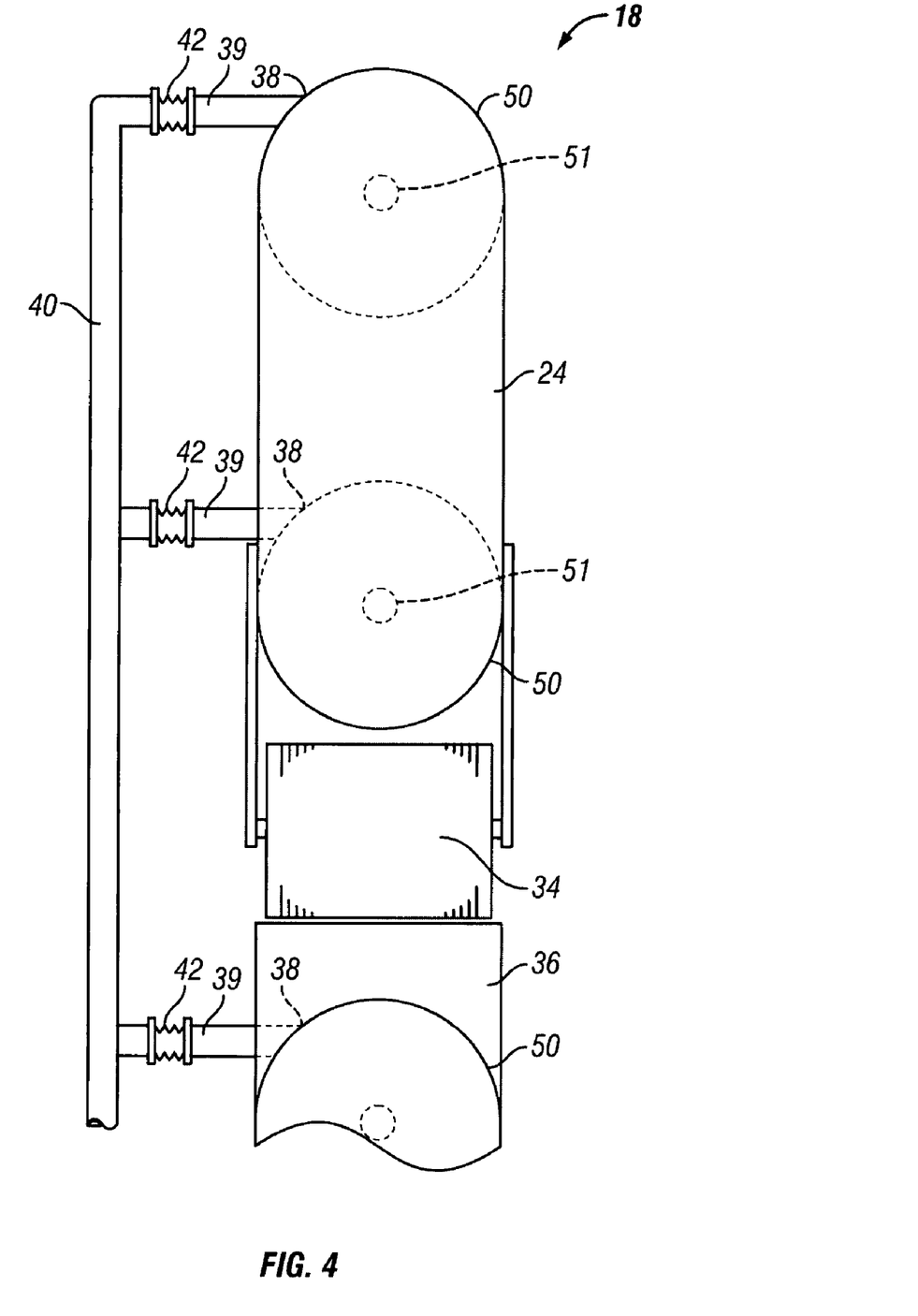
FIG. 4 is an enlarged end view of a portion of the apparatus depicted in FIG. 3.

FIGS. 2-4 show that distillates are removed from within each conveyor 22. As best seen in FIG. 4, at least one distillate tap outlet 38 is provided in the side of each conveyor 22 to permit distillates to exit the conveyor for collection and beneficial use. The tap outlet 38 is an aperture in the wall of the auger conduit 50, and is in fluid communication with a pipe or conduit transverse 39. Each transverse conduit 39 optionally is in fluid communication with a collector of any suitable type, such as a pipe-like collection manifold 40. The junctions between each transverse 39 and any collector, such as the manifold 40, are securely sealed against the passage of gas into or out of the transverse and manifold, so as to maintain the purity of distillates, and to prevent air from entering the distillation array 18. The transverse conduit 39 and manifold 40 also preferably are insulated, particularly to reduce cooling of substances flowing there-through and thus avoid unwanted condensation. Additionally, the outlet from the manifold 40 preferably is provided with a valve or liquid seal (not shown) within the art to prevent a back-flow of distillates or gases in the manifold toward the array 18. The discharge of the manifold preferably also may transit the system via a carbon plug and/or filter (not shown) for filtration of the distillates.

As pyrolysis and distillation occur in the distillation array 18, the distillates flow to and out the taps 38. The distillates and other byproducts, potentially of significant commercial value, flow from the taps 38 to the manifold 40 via the transverse conduits 39. The substances flowing through the manifold 40 are conveyed out of the system and collected for storage and transportation to intended locations of further use. Persons of skill in the art will immediately recognize that the manifold 40 is an optional feature. In alternative embodiments, each transverse 39 may convey the distilled substances flowing there-though directly to a separate collector device or system for storage or transportation, so as to avoid mixing distillates that are extracted from distinct taps 39 (possibly in different conveyors 22).

To accommodate the shifting movements of the conveyors 22 in response to thermal contraction/expansion, each transverse conduit 39 is provided with a flexible member 42. A flexible member 42 allows each conveyor 22 to move independently in relation to the manifold 40, or in relation to any other component to which the transverse 39 may be operably connected and to which the distillates are delivered. Flexible member 42 may be any of a number of flexible components known in the art for transporting high-temperature gasses and liquids. The member 42 may be fabricated from, for example, a woven metal (e.g. stainless steel) fabric configured as a tube, or perhaps as a freely bendable bellows. A beneficial result of the presence of the flexible member 42 is that each auger conduit 50 is movable axially to-and-fro in relation to the manifold (or alternative collector device) 40. Consequently, the manifold 40 itself may be substantially fixed in position, but remains unaffected and unstressed by the thermally induced shifting of the conduits 50.

In FIG. 4, elements 38 are taps wherein gasses generated from the distillation of the feedstock are removed. Upon studying this application, those skilled in the art will readily recognize that the number of taps 38 and/or the physical location of such taps can be adjusted to create results which are more optimized for a given feedstock. Material which exits auger array 18 at outlet 26 can be a solid, liquid, or combination thereof, depending on the feedstock used as well as the maximum temperature to which auger array 18 is heated.

A central advantage of the present apparatus is that it is automatically self-adjusting to accommodate and relieve mechanical stresses attributable to temperature changes in system components. This need is most pressing within the components of the distillation array 18, which has various elements which not only differ in temperature one from another during operation, but whose elements themselves may suffer within themselves significant thermal gradients at any given time, or undergo repeated and substantial changes in temperature over a period of time. Changes in component temperature, of course, result in expansion or contraction proportional to the coefficient of thermal expansion of the component material. Many of the components of the distillation array 18, particularly the conveyors 22 comprised of auger conduits 50, preferably are manufactured from steels which can contract or expand dimensionally, especially longitudinally, in response to temperature changes.

Thermal contraction and expansion, given the high operating temperatures of the distillation array, can result in tremendous and deleterious mechanical stresses in array components. Indeed, if left unaddressed, such stresses can result in ruptures in the distillation array. Ruptures in a pyrolytic chamber, whether in a batch method or a continuous process like the present, at minimum compromises system efficiency and the purity of distillates, and at worse can cause system failure or even catastrophic explosion.

For example, a stacked distillation array having lateral conveyor sections 22 of 40 feet in length and a thermal difference of 1,100 degrees Fahrenheit can result in a longitudinal thermal expansion or contraction change of about four inches. Such large changes in component size/length could wreak havoc at welded or bolted joints, collars, junctions, and other mating surfaces. There thus is a need for a method and apparatus which provides a successfully operating continuous flow fractional destructive distillation array but which can self-adjust for large amounts of differential thermal expansion.

The present apparatus accommodates thermally induced expansion and contraction, particularly on the longitudinal axes of the conveyors 22 within the array 18, by providing means for the conveyors to shift axially in response to changing temperature. The conveyors 22 are mounted upon, and separated by, rollers that allow the conveyors effectively to roll past one another in response to thermal stress.

As best illustrated in FIG. 2, friction-reducing members, preferably rollers 34, are preferably disposed between each of the lateral conveyors 22 and are preferably located below each of the down-chutes 24. While not critical, in one embodiment, the length of each lateral auger is approximately 40 feet. Because each of lateral conveyors 22 preferably is heated to a different temperature conductive to rendering a different component of a feedstock, the temperature differential between the first or top-most lateral conveyor 22 and the last or bottom-most conveyor 23 can be significant. For example, an auger array which is used for distilling shredded automobile tires can have a temperature difference of 1100 degrees Fahrenheit between a first lateral auger conduit and the final lateral auger conduit. With a span of nearly 40 feet and a temperature differential of about 1100 degrees, the thermal expansion of each lateral auger conduit section may be substantial. With such a large amount of expansion and subsequent contraction, rollers 34, in cooperation with the array lower roller 28 and the feeder auger rollers 20, permit the distillation array 18 to shift and move freely without creating intolerable tension, compression, or flexion in any of the array components. Rollers 34 may have any design-specified diameter and axial width, and may optionally be wheels. Alternatively, ball-bearings may be configured in appropriate housings to function as wheels.

The drawing figures all depict rollers 34 rotatably mounted upon the conveyors 22. In the preferred embodiment, one or more rollers 34 are situated between adjacent pairs of auger conduits 50. Reference to the drawings shows that a roller 34 preferably (but not necessarily) is provided at the end of each conduit 50 below a down-chute 24. Each adjacent pair of conduits thus is held in spaced-apart relation by a roller 34 at one end of the pair, and a down-chute 24 at the opposite end of the pair. The figures show the preferred embodiment in which each roller 34 is mounted below the conduit 50 to which it is connected. (Alternative embodiments could invert the rollers, such that they are mounted above the conduit to which they attach, and engage against the bottom of the conduit immediately above.)

As best seen in FIGS. 2 and 3 there preferably is provided, on the top of one end of each conduit 50, a roller block 36 in corresponding association with a roller 34 immediately above. The roller blocks are strong, durable, platforms securely mounted on the top of a cylindrical conduit 50 to provide a relatively broad, smooth surface upon which the roller 34 may roll. Each roller block 36 offers a horizontal plane of sufficient extent, particularly axially with the conduit 50 that the roller 34 remains in contact with the roller block over the full range of thermal contraction/expansion changes in conduit length.

The relative sizes of the rollers 34 and conduits 50, and the relative lengths of the down-chutes 24 and the spacing between conduits 50 seen in the drawings, are for illustrative purposes only and are not limiting of the disclosure. The conduits 50 need not be cylindrical, but may have any practical cross-sectional shape. Further, the lengths and diameters of the conveyors 22 can be designed to dimensions as needed.

It may be preferable, in many configurations of the present apparatus, to minimize the length of the down-chutes 24 and to place the conveyors as close together as practicable; in such designs, the rollers 34 will be very modest in relative diameter.

Referring to FIGS. 1 and 3, it is seen that the pyrolysis unit 10 of this disclosure, and its individual components, are able to undergo significant changes due to thermal contraction and expansion without deleterious stresses and strains. In the first instance, it is observed that the entire pyrolysis unit 10 has a freedom of movement to prevent potentially damaging cumulative size changes resulting from expansion/contraction of individual unit components. The entire pyrolysis unit 10 may shift (right-to-left-to-right as depicted in FIG. 1) as a result of its ability to roll upon the feeder auger rollers 20 and array lower rollers 28. The unit 10 is reliably secured to the ground at the secure blocks 30, but as expansion and contraction occurs in the components of the unit, the cumulative affect thereof is accommodated and relieved by the rolling (in either direction) of the unit 10 relative to the ground. If needed to accommodate cumulative size changes in the distillation array 18, the distillation array may shift modestly, to relieve stresses within the array, by rolling upon the array lower roller 28. Similarly, size changes in the array 18, particularly in the upper portions thereof, urge the feeder auger 16 and liquid seal 20 to roll as needed upon the feeder auger rollers 20.

As the gross, cumulative, affects of thermal expansion and contraction are addressed by movement upon the rollers 20 and 28 upon the ground, smaller more discrete size changes within the array 18 and between conveyors 22 are accommodated by rolling movements upon the rollers 34. Notably, any adjacent pair of conveyors has a roller 34 situated therebetween. Consequently differences, in axial changes in length, between adjacent pairs of conveyors 22 are addressed by the conveyors' rolling relative to each other. The change differentials may be a matter of degree only (e.g., adjacent conveyors both expand, but different amounts) or may be opposite in sense (one conveyor expands while its neighbor contracts); in either case, the array automatically adjusts through small movements upon any or all the rollers 34. Further, and as suggested by the large directional arrows in FIG. 3, the relatively rigid down-chutes 24 joining adjacent pairs of conduits 50 may roll to and fro as a result of the roller 34 beneath each conduit 50.

A person skilled in the art will appreciate that the rollers 20, 28, 34 can take many forms. All types of wheel-like components rotatably mounted upon an axle, as well as ball bearing devices, are included in the definition of "roller" as used in this application. Further, friction-reducing members in the foregoing disclosure and in the claims, include any type of glide or skid plate devised to promote a smooth, sliding movement between contacting components. For example, a pair of parallel planar plates in slidable contact, perhaps with TEFLON® coating or sheets there-between, is included as a feasible type of friction-reducing member within the scope of the claims.

Although the invention has been described in detail with particular reference to these preferred embodiments, other embodiments can achieve the same results. Variations and modifications of the present invention will be obvious to those skilled in the art and it is intended to cover by the appended claims all such modifications and equivalents. The entire disclosures of all patents and publications cited above are hereby incorporated by reference.

What is claimed is:

1. An apparatus for the pyrolysis of a feedstock, the apparatus comprising:
    at least two conveyors for moving the feedstock, an upper one of said conveyors disposed above and substantially adjacent to a lower one of said conveyors;
    a drop chute between said upper conveyor and said lower conveyor, through which feedstock moves from said upper to said lower conveyor; and
    at least one friction-reducing member disposed between said conveyors whereby one of said conveyors is movable relative to the other said conveyor.

2. An apparatus according to claim 1 wherein said conveyors comprise closed auger conduits.

3. An apparatus according to claim 2 wherein said auger conduits are substantially parallel and horizontal.

4. An apparatus according to claim 3 wherein said upper auger conduit moves feedstock directionally opposite from said lower auger conduit, and said wherein said drop chute connects ends of said auger conduits.

5. An apparatus according to claim 2 wherein said friction-reducing member comprises a roller.

6. An apparatus according to claim 1 further comprising:
    a tap outlet in at least one of said conveyors for releasing substances from within said conveyor;
    a transverse conduit for conveying substances from said tap outlet to a collector; and
    a flexible member in said transverse conduit for accommodating movement of said conveyor relative to said collector.

7. An apparatus for the pyrolysis and distillation of a feedstock, the apparatus comprising a distillation array comprising:
    a plurality of stacked, generally horizontal, heated conveyors for moving the feedstock;
    drop chutes between adjacent conveyors, through which feedstock moves from one conveyor to the next;
    at least one friction-reducing member disposed between adjacent conveyors whereby said conveyors are movable in opposite directions past one another.

8. An apparatus according to claim 7 further comprising:
    a block at a location on the bottom of the distillation array for securing a portion of the array to a supporting surface; and
    a friction-reducing member at another location on the bottom of the array and engagable with a supporting surface whereby at least apportion of the array may smoothly shift across a supporting surface.

9. An apparatus according to claim 7 further comprising:
    a feed auger for feeding feedstock into the distillation array; and
    a friction-reducing member at a location on the bottom of the feeder auger and engagable with a supporting surface whereby at least apportion of the array may smoothly shift across a supporting surface.

10. An apparatus for the pyrolysis and distillation of a feedstock, the apparatus comprising a distillation array comprising:
    a plurality of stacked, generally horizontal, heated closed auger conduits for moving the feedstock;
    drop chutes between adjacent auger conduits, through which feedstock moves from one conduit to the next;

at least one friction-reducing member disposed between adjacent conduits whereby said auger conduits are movable in opposite axial directions relative to one another.

11. An apparatus according to claim 10 wherein said auger conduits are substantially parallel and horizontal.

12. An apparatus according to claim 11 wherein an upper auger conduit moves feedstock directionally opposite from a lower auger conduit, and said wherein a drop chute connects ends of said upper and lower auger conduits.

13. An apparatus according to claim 12 wherein said friction-reducing member comprises a roller.

14. An apparatus according to claim 10 further comprising:

a tap outlet in at least one of said conveyors for releasing substances from within said conveyor;

a transverse conduit for conveying substances from said tap outlet to a collector; and a flexible member in said transverse conduit for accommodating movement of said conveyor relative to said collector.

* * * * *